US012632106B2

(12) United States Patent
Ben Himane

(10) Patent No.: US 12,632,106 B2
(45) Date of Patent: *May 19, 2026

(54) DEVICE TRACKING BASED ON DISPLAYED MARKER

(71) Applicant: Apple Inc., Cupertino, CA (US)

(72) Inventor: Mohamed Selim Ben Himane, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/024,397

(22) Filed: Jan. 16, 2025

(65) Prior Publication Data

US 2025/0155968 A1 May 15, 2025

Related U.S. Application Data

(63) Continuation of application No. 18/654,595, filed on May 3, 2024, which is a continuation of application
(Continued)

(51) Int. Cl.
*G06F 3/01* (2006.01)
*G06F 3/0346* (2013.01)
*G06T 7/70* (2017.01)

(52) U.S. Cl.
CPC ............ *G06F 3/011* (2013.01); *G06F 3/0346* (2013.01); *G06T 7/70* (2017.01); *G06T 2200/24* (2013.01); *G06T 2207/30204* (2013.01)

(58) Field of Classification Search
CPC ........ G06F 3/011; G06F 3/0346; G06F 3/013; G06F 3/0304; G06F 3/016; G06T 7/70;
(Continued)

(56) References Cited

U.S. PATENT DOCUMENTS 8,400,449 B1 3/2013 Davidson
8,587,549 B2 11/2013 Whytock
(Continued)

FOREIGN PATENT DOCUMENTS

CN 102122392 A 7/2011
CN 103999551 A 8/2014
(Continued)

OTHER PUBLICATIONS

The State Intellectual Property Office of the People's Republic of China, Notification of the First Office Action (English translation), Chinese Patent Application No. 201910866381.4, 2 pages, Sep. 10, 2021.
(Continued)

*Primary Examiner* — David D Davis
(74) *Attorney, Agent, or Firm* — Thompson Hine LLP

(57) ABSTRACT

Some implementations provide improved user interfaces for interacting with a virtual environment. The virtual environment is presented by a display of a first device having an image sensor. The first device uses the image sensor to determine a relative position and orientation of a second device based on a marker displayed on a display of the second device. The first device uses the determined relative position of the second device to display a representation of the second device including virtual content in place of the marker.

20 Claims, 9 Drawing Sheets

700

Related U.S. Application Data

No. 17/314,130, filed on May 7, 2021, now Pat. No. 12,008,151, which is a continuation of application No. 16/567,970, filed on Sep. 11, 2019, now Pat. No. 11,036,284.

(60) Provisional application No. 62/731,285, filed on Sep. 14, 2018.

(58) Field of Classification Search
CPC ....... G06T 2200/24; G06T 2207/30204; G06T 7/74
See application file for complete search history.

(56) References Cited

U.S. PATENT DOCUMENTS

| | | | |
|---|---|---|---|
| 9,292,085 | B2 | 3/2016 | Bennett |
| 9,734,634 | B1 | 8/2017 | Mott |
| 9,778,814 | B2 | 10/2017 | Ambrus |
| 9,898,091 | B2 | 2/2018 | Bristol |
| 9,972,137 | B2 | 5/2018 | Petrovskaya |
| 10,007,329 | B1 | 6/2018 | Holz |
| 10,070,224 | B1 | 9/2018 | Miller |
| 10,147,243 | B2 | 12/2018 | Yamamoto |
| 10,318,007 | B2 | 6/2019 | Lee |
| 10,339,716 | B1 | 7/2019 | Powers |
| 11,023,035 | B1 | 6/2021 | Atlas |
| 11,036,284 | B2 | 6/2021 | Himane |
| 11,243,734 | B2 | 2/2022 | Boissière et al. |
| 11,379,033 | B2 | 7/2022 | O'Hern |
| 11,907,421 | B1 | 2/2024 | Clements |
| 2009/0160773 | A1 | 6/2009 | Bohn |
| 2010/0156787 | A1 | 6/2010 | Katayama |
| 2011/0138317 | A1 | 6/2011 | Kang |
| 2011/0169861 | A1 | 7/2011 | Suzuki |
| 2012/0032955 | A1 | 2/2012 | Matsuda |
| 2012/0253485 | A1 | 10/2012 | Weast |
| 2012/0256954 | A1 | 10/2012 | Soon-Shiong |
| 2013/0155106 | A1 | 6/2013 | Rolleston |
| 2013/0187835 | A1 | 7/2013 | Vaught |
| 2013/0215148 | A1 | 8/2013 | Antonyuk |
| 2013/0307875 | A1 | 11/2013 | Anderson |
| 2014/0035819 | A1 | 2/2014 | Tyler |
| 2014/0092014 | A1 | 4/2014 | Srinivasan |
| 2014/0343699 | A1 | 11/2014 | Engelen |
| 2015/0062161 | A1 | 3/2015 | Kim |
| 2015/0094142 | A1 | 4/2015 | Stafford |
| 2015/0234454 | A1 | 8/2015 | Kurz |
| 2016/0027216 | A1 | 1/2016 | Da Veiga |
| 2016/0180589 | A1 | 6/2016 | Bean |
| 2016/0267712 | A1 | 9/2016 | Nartker |
| 2016/0267720 | A1 | 9/2016 | Mandella |
| 2016/0292922 | A1 | 10/2016 | Kasahara |
| 2016/0314100 | A1 | 10/2016 | Seo |
| 2016/0328021 | A1 | 11/2016 | Lee |
| 2016/0350972 | A1 | 12/2016 | Kauffmann |
| 2016/0357261 | A1 | 12/2016 | Bristol |
| 2016/0361637 | A1 | 12/2016 | Higgins |
| 2016/0361643 | A1 | 12/2016 | Allin |
| 2016/0364910 | A1 | 12/2016 | Higgins |
| 2017/0011553 | A1 | 1/2017 | Chen |
| 2017/0038837 | A1 | 2/2017 | Faaborg et al. |
| 2017/0052373 | A1 | 2/2017 | Memmott |
| 2017/0061694 | A1 | 3/2017 | Giraldi et al. |
| 2017/0061700 | A1 | 3/2017 | Urbach |
| 2017/0076502 | A1 | 3/2017 | Chen |
| 2017/0103574 | A1 | 4/2017 | Faaborg |
| 2017/0115839 | A1 | 4/2017 | Park |
| 2017/0131964 | A1 | 5/2017 | Baek |
| 2017/0168296 | A1 | 6/2017 | Giwnewer |
| 2017/0168651 | A1 | 6/2017 | Ikeda |
| 2017/0228922 | A1 | 8/2017 | Kaeser |
| 2017/0243324 | A1 | 8/2017 | Mierle |
| 2017/0243403 | A1 | 8/2017 | Daniels |
| 2017/0249745 | A1 | 8/2017 | Fiala |
| 2017/0282062 | A1* | 10/2017 | Black ..................... A63F 13/25 |
| 2017/0308258 | A1 | 10/2017 | Xu |
| 2018/0025248 | A1 | 1/2018 | Shan |
| 2018/0053351 | A1 | 2/2018 | Anderson |
| 2018/0061133 | A1 | 3/2018 | Wu |
| 2018/0136743 | A1 | 5/2018 | Seegmiller |
| 2018/0158250 | A1 | 6/2018 | Yamamoto |
| 2018/0164589 | A1 | 6/2018 | Watanabe |
| 2018/0173320 | A1 | 6/2018 | Bristol |
| 2018/0311585 | A1 | 11/2018 | Osman |
| 2018/0321737 | A1 | 11/2018 | Pahud |
| 2018/0350150 | A1 | 12/2018 | Powderly |
| 2019/0056791 | A1 | 2/2019 | Holz |
| 2019/0057550 | A1 | 2/2019 | Aurongzeb |
| 2019/0075266 | A1 | 3/2019 | Jeong et al. |
| 2019/0196710 | A1 | 6/2019 | Jiang |
| 2019/0212901 | A1 | 7/2019 | Garrison |
| 2019/0356848 | A1 | 11/2019 | Rydberg |
| 2019/0384419 | A1 | 12/2019 | Li |
| 2020/0051337 | A1 | 2/2020 | Reynolds |
| 2020/0193649 | A1 | 6/2020 | Moon |
| 2020/0201515 | A1 | 6/2020 | Moon |
| 2020/0265750 | A1 | 8/2020 | Marquinez |
| 2021/0096638 | A1 | 4/2021 | O'Hern |
| 2021/0209364 | A1 | 7/2021 | Park |
| 2022/0269338 | A1 | 8/2022 | O'Hern |
| 2024/0012475 | A1 | 1/2024 | Sztuk |
| 2024/0103613 | A1 | 3/2024 | Chawda et al. |

FOREIGN PATENT DOCUMENTS

| | | | |
|---|---|---|---|
| CN | 104603865 A | 5/2015 | |
| CN | 104750230 A | 7/2015 | |
| CN | 105705210 A | 6/2016 | |
| CN | 105867617 A | 8/2016 | |
| CN | 105980976 A | 9/2016 | |
| CN | 106527696 A | 3/2017 | |
| CN | 107077209 A | 8/2017 | |
| CN | 107646098 A | 1/2018 | |
| CN | 107743604 A | 2/2018 | |
| CN | 107850943 A | 3/2018 | |
| CN | 108073276 A | 5/2018 | |
| CN | 108292146 A | 7/2018 | |
| CN | 110069230 A | 7/2019 | |
| JP | 7649396 B2 * | 3/2025 | ............. G06F 3/017 |
| WO | 2012135546 A1 | 10/2012 | |
| WO | 2013171731 A1 | 11/2013 | |
| WO | 2015048038 A2 | 4/2015 | |
| WO | 2015119444 A1 | 8/2015 | |
| WO | 2017007637 A1 | 1/2017 | |
| WO | 2017048519 A1 | 3/2017 | |
| WO | 2017065958 A1 | 4/2017 | |
| WO | 2019067642 A1 | 4/2019 | |
| WO | 2021061441 A1 | 4/2021 | |

OTHER PUBLICATIONS

U.S. Patent and Trademark Office, Non-Final Office Action issued Nov. 24, 2023, which pertains to U.S. Appl. No. 17/372,935, filed Jul. 12, 2021. 22 pgs.

Lee, Johnny, "Low-Cost, Multi-Touch Whiteboard Using the Wiimote," (Dec. 7, 2007), 1 page, XP054981165, retrieved from the internet Dec. 3, 2020, https://www.youtube.com/watch?v=5s5EvhH7eQ.

"Introducing the Logitech Bridge SDK"; Vive team; https://blog.vive.com/us/2017/11/02/introducing-the-logitech-bridge-sdk; Nov. 11, 2017 pp. 1-6.

Goode, Lauren, "Houzz has a new AR mode that lets you try furniture before you buy", The Verge, Tech/Circuit Breaker, May 3, 2017, pp. 1-3.

"This Guy turned his iPhone into a portal, and soon you can too", JAMF/NOW, https://www.imore.com/check-out-amazing-optical-illusion-created-arkit, Jun. 11, 2019, pp. 1-9.

"The Parallax View on the App Store", https://itunes.apple.com/us/app/theparallaxview/id352818700?mt=8, Jun. 11, 2019, pp. 1-3.

Lopez, David et al., "Towards an Understanding of Mobile Touch Navigation in a Stereoscopic Viewing Environment for 3D Data

(56) References Cited

OTHER PUBLICATIONS

Exploration," IEEE Transactions on Visualization and Computer Graphics, Institute of Electronics Engineers, 2016, 22 (5), pp. 1616-1629.

Aleksandrova, Mary, "Augmented Reality in Education: The Hottest EdTech Trend 2018 and How to Apply It to Your Business," https://easternpeak.com/blog/augmented-reality-in-education-the-hottest-edtech-trend-2018, Apr. 24, 2018, pp. 1-18.

Mike, "HoloLens 'Final Fantasy XIV' Concept Video Shows AR as a Perfect 'Second Screen' for Today's Games," https://pxvr.com/hololens-final-fantasy-xiv-concept-video-shows-ar-as-a-perfect-second-sc . . . , Feb. 6, 2017, pp. 1-5.

Aguilar, Nelson, "How to Use Augmented Reality to Try On the Apple Watch with Your iPhone," https://mobile-ar.reality.news/how-to/use-augmented-realit-try-apple-watch-with-you-ip . . . , Mar. 27, 2015, pp. 1-5.

Brennan, Dominic, et al. "4 Virtual Reality Desktops for Vive, Rift and Windows VR Compared," https://www.roadtovr.com/virtual-realituy-desktop-compared-oculus-rift-htc-viv/, Jan. 3, 2018, pp. 1-5.

Roettgers, Janko, "Facebooks Oculus Quest Shows How AR and VR Could Merge One Day," May 22, 2019, pp. 1-6.

Vive RS, "Everything You need to Know for an Epic Journey," Aug. 26, 2020, pp. 1-6.

The State Intellectual Property Office of the People's Republic of China, Office Action, Chinese Patent Application No. 201910866381. 4, 5 pages, Sep. 10, 2021.

The State Intellectual Property Office of the People's Republic of China, Patent Search Report (with English translation), Chinese Patent Application No. 201910866381.4, 5 pages, Sep. 10, 2021.

China National Intellectual Property Administration, Patent Search Report (with English translation), Chinese Patent Application No. 2022103042886, 5 pages, Oct. 22, 2024.

U.S. Patent and Trademark Office, Final Office Action issued in U.S. Appl. No. 18/654,595 dated Dec. 23, 2025 (13 pages).

U.S. Patent and Trademark Office, Decision on Appeal issued in U.S. Appl. No. 17/742,674 [Appeal No. 2025-002759] dated Jan. 30, 2026 (Eight (8) pages).

* cited by examiner

130

CPU(s)
502

Comm.
Interface(s)
508

Display(s)
512

Memory 520

Operating System 530

User Interface Module 540

Inertial Tracking Unit 542

Marker Display Unit 544

Drift Correction Unit 546

Controller Unit 548

504

I/O Device(s)
& Sensor(s)
506

Programming
Interface(s)
510

Image Sensor
System(s)
514

700

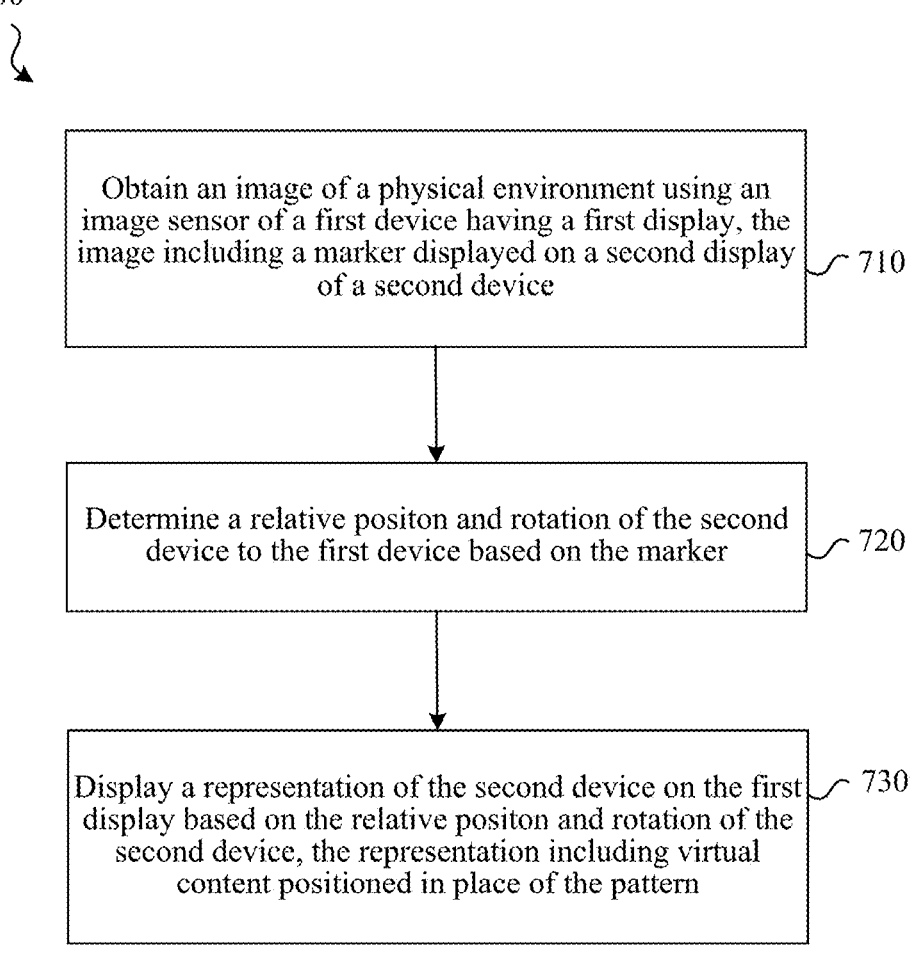

Obtain an image of a physical environment using an image sensor of a first device having a first display, the image including a marker displayed on a second display of a second device ⌐ 710

Determine a relative positon and rotation of the second device to the first device based on the marker ⌐ 720

Display a representation of the second device on the first display based on the relative positon and rotation of the second device, the representation including virtual content positioned in place of the pattern ⌐ 730

DEVICE TRACKING BASED ON DISPLAYED MARKER

CROSS-REFERENCE TO RELATED APPLICATION

This application is a continuation of U.S. patent application Ser. No. 18/654,595 filed May 3, 2024, which is a continuation application of U.S. patent application Ser. No. 17/314,130 filed May 7, 2021 (now U.S. Pat. No. 12,008, 151), which is a continuation of U.S. patent application Ser. No. 16/567,970 filed Sep. 11, 2019 (now U.S. Pat. No. 11,036,284), which claims the benefit of U.S. Provisional Application Ser. No. 62/731,285 filed Sep. 14, 2018, each of which is incorporated herein by reference in its entirety.

TECHNICAL FIELD

The present disclosure generally relates to electronic devices used to provide and interact with content, and in particular, to systems, methods, and devices that track the relative locations of electronic devices and use such locations to provide interactivity, for example, with computer-generated reality (CGR) environments.

BACKGROUND

To enable user interactions with electronic content, it may be desirable to enable a user to provide input via a separate real-world device, such as the touch screen of a separate mobile device. However, existing systems are unable to adequately track the locations of such separate devices relative to the content providing devices and thus are unable to display such separate devices or representations of them to guide the users' interactions. For example, a user wearing a head-mounted device (HMD) presenting a CGR environment would need to see a representation of his mobile phone in the CGR environment in order to use the touch screen of the mobile phone as an input device. However, without being able to accurately, consistently, and efficiently track the relative location of the mobile phone to the HMD, the representation of the mobile phone cannot be displayed at locations in the CGR environment corresponding to the real-world locations.

SUMMARY

Various implementations disclosed herein include devices, systems, and methods that provide improved user interfaces for interacting with electronic content using multiple electronic devices. Some implementations involve a first device (e.g., a head-mounted device (HMD)) that has an image sensor (e.g., a camera) and one or more displays, as well as a second device (e.g., a mobile phone) that has a display. A marker is displayed on the display of the second device and the first device determines a relative position and orientation of the second device to the first device based on the marker. In some implementations, a marker is an image containing texture/information that allows the image to be detected and makes it possible to determine the image's pose with respect to a camera. In some implementations, a control signal is generated based on the relative position and orientation of the second device (e.g., the first device uses the position and orientation of the second device to enable the second device to be used as a three-dimensional (3D) controller, 3D pointer, user interface input device, etc.) In some implementations, a representation of the second device including virtual content in place of the marker is displayed on the display of the first device based on the determined relative position of the second device.

In some implementations, the second device has a touch screen and, in some implementations, the virtual content positioned in place of the marker comprises a control (e.g., button) corresponding to an interaction with the user experience/content provided by the first device. For example, the first device may display a CGR environment that includes a virtual remote control having virtual buttons as the representation of a mobile phone. The virtual remote control is displayed at a location corresponding to the real-world location of the mobile phone. When the user virtually touches a virtual button on the virtual remote control, the user actually touches a corresponding portion of the touch screen of the second device, which is recognized as input that controls or otherwise initiates an interaction with the virtual environment.

In some implementations, the relative position and orientation of the second device to the first device is adjusted over time based on motion tracking on the first device and the second device over time, e.g., Inertial Measurement Unit (IMU) data from an Inertial Measurement Unit (IMU) sensor of the first device or the second device. Moreover, in some implementations, the relative position and orientation of the second device to the first device is adjusted over time based on additional images depicting the marker.

In some implementations, it is detected that an estimated error associated with the relative position and orientation of the second device to the first device is greater than a threshold (e.g., drift). In accordance with detecting that the estimated error is greater than the threshold, an additional image including the marker is obtained. The relative position and orientation of the second device to the first device is adjusted over time based on the additional image. In some implementations, the marker is determined based on an attribute of the physical environment, e.g., a lighting condition. In some implementations, the marker in the additional images is adaptive (e.g., changing over time based on circumstances). In some implementations, the marker is positioned on only a portion of the second display based on detecting an obstruction between the image sensor and the second display. Moreover, the marker may be positioned on a portion of the second display based on detecting a touch event on the second display (e.g., the user's finger blocking another portion of the display).

In some implementations, a light source (e.g., a sequence of LEDs, a pixel-based display, a visible light source, an infrared (IR) light source that produces light that is not generally visible to humans, etc.) on a second device produces light at a given instant in time that encodes data useful in synchronizing motion data (e.g., accelerometer data, IMU data, etc.) generated via that second device with processing being performed by a first device. In some implementations, a method involves obtaining an image of a physical environment using the image sensor of a first device. The image includes a depiction of a second device. The depiction of the second device includes a depiction of a light-based indicator provided via a light source on the second device.

The method synchronizes motion data generated via the second device with processing being performed by the first device (e.g., interpretation of the image) based on the depiction of the light-based indicator. For example, the second device's light-based indicator may be a plurality of LEDs that produce a binary pattern of light encoding current motion data generated at the second device. In another example, such LEDs may produce a binary pattern of light that encodes time data associated with generation of the motion data via the second device, e.g., the time that a motion sensor on the device captured the data relative to the time that the binary pattern is provided. In other implementations, the second device includes a pixel-based display that displays a pattern that encodes the motion or time data of the second device. In other implementations, the device includes an IR light source that produces a pattern of IR light encoding information such as motion data generated at the second device. The first device may synchronize the motion data of the second device with positioning data that it determines via computer vision processing of the image, e.g., associating the second device's current motion as provided in the light-based indicator with the second device's current relative position as determined via computer vision.

The method may generate a control signal based on the synchronizing of the motion data with the image. For example, if the motion data of the second device is associated with a movement of the second device intended to move an associated curser displayed on the first device, the method may generate an appropriate signal to cause such movement of the cursor.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of providing an improved user interface for interacting with a virtual environment in accordance with some implementations.

Figure 1:
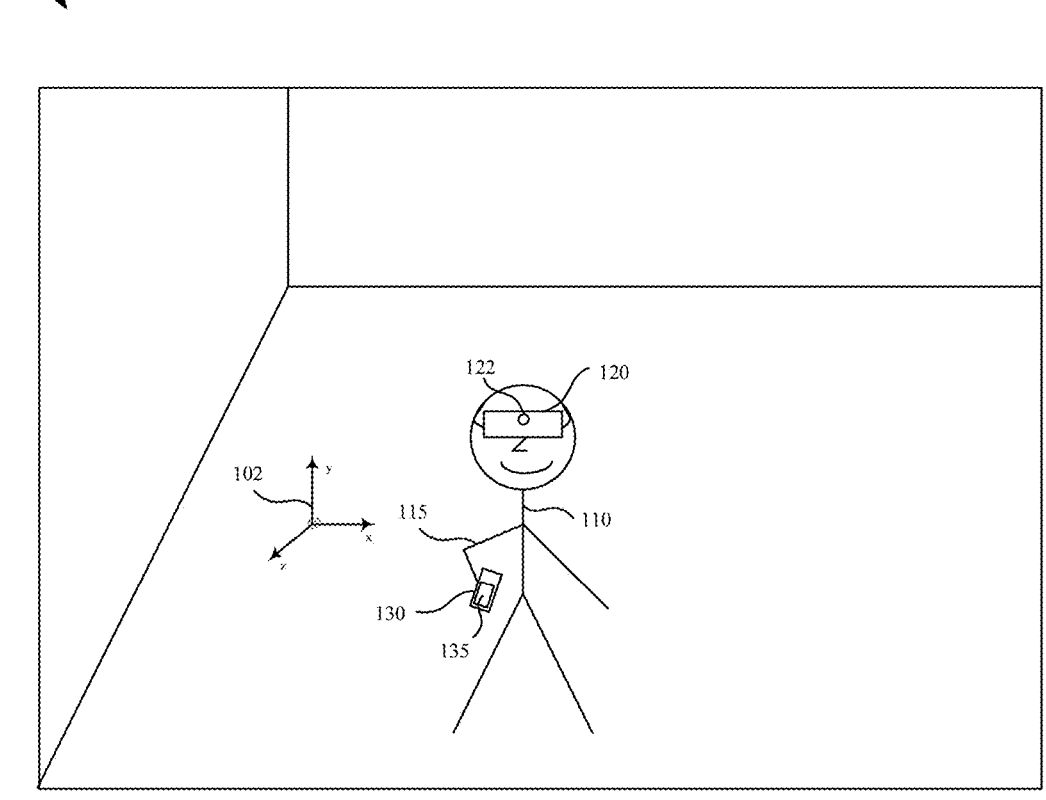
FIG. 1 is a block diagram of an example physical environment including a user, a first device, and a second device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example physical environment 100 including a user 110, a physical first device 120, and a physical second device 130. In some implementations, the physical first device 120 is configured to present the user 110 with content such as a CGR environment. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In FIG. 1, physical first device 120 is shown as an HMD. Those skilled in the art will recognize that an HMD is but one form factor that is suitable for implementing physical first device 120. Other form factors that are suitable for implementing physical first device 120 include smartphones, AR glasses, smart glasses, desktop computers, laptops, tablets, computing devices, and the like. In some implementations, physical first device 120 includes a suitable combination of software, firmware, or hardware. For example, physical first device 120 may include an image sensor (e.g., image sensor 122) and a display. In some implementations, physical first device 120 includes a display on an inward facing surface of physical first device 120.

In some implementations, a multitude of cameras are used in the physical first device 120, as well as the physical second device 130, to capture image data of the physical environment 100. Moreover, image sensor 122 may be positioned at other locations besides the location depicted in FIG. 1. In some implementations, image sensor 122 includes a high quality, high resolution RGB video camera, for example a 10 megapixel (e.g., 3072×3072 pixel count) camera with a frame rate of 60 frames per second (FPS) or greater, horizontal field of view (HFOV) of greater than 90 degrees, and with a working distance of 0.1 meters (m) to infinity.

In some implementations, image sensor 122 is an infrared (IR) camera with an IR illumination source or Light Detection and Ranging (LIDAR) emitters and receivers/detectors) that, for example, capture depth or range information for objects and surfaces in the physical environment 100. The range information may, for example, be used in positioning virtual content composited into images of the physical environment 100 at correct depths. In some implementations, the range information may be used in adjusting the depth of real objects in the environment when displayed; for example, nearby objects may be re-rendered to be smaller in the display to help the user 110 in avoiding the objects when moving about in the environment.

In some implementations, the physical first device 120 and the physical second device 130 are communicatively coupled via one or more wired or wireless communication channels (e.g., BLUETOOTH, IEEE 802.11x, IEEE 802.16x, IEEE 802.3x, etc.). While this example and other examples discussed herein illustrate a single physical first device 120 and a single physical second device 130 in a real world physical environment 100, the techniques disclosed herein are applicable to multiple devices as well as to other real world environments. Moreover, the functions of the physical first device 120 may be performed by multiple devices and, similarly, the functions of the physical second device 130 may be performed by multiple devices.

In some implementations, the physical first device 120 is configured to present a CGR environment to the user 110. In some implementations, the physical first device 120 includes a suitable combination of software, firmware, or hardware. In some implementations, the user 110 wears the physical first device 120 on his/her head, e.g., an HMD. As such, the physical first device 120 may include one or more displays provided to display images. The physical first device 120 may enclose the field-of-view of the user 110, e.g., an HMD. The physical first device 120 is described in greater detail below with respect to FIG. 4 and FIG. 6.

In some implementations, the physical first device 120 presents a CGR experience to the user 110 while the user 110 is physically present within the physical environment 100 and virtually present within a CGR environment. In some implementations, while presenting a user 110 with the CGR environment, the physical first device 120 is configured to present CGR content and to enable optical see-through of at least a portion of the physical environment 100. In some implementations, while presenting a CGR environment, the physical first device 120 is configured to present CGR content and to enable video pass-through of the physical environment 100.

In some implementations, image sensor 122 is configured to obtain image data corresponding to the physical environment (e.g., physical environment 100) in which physical first device 120 is located. In some implementations, image sensor 122 is part of an array of image sensors configured to capture light field images corresponding to a physical environment (e.g., physical environment 100) in which the physical first device 120 is located.

In some implementations, as illustrated in FIG. 1, the physical second device 130 is a handheld electronic device (e.g., a smartphone or a tablet) including a physical display 135. In some implementations the physical second device 130 is a laptop computer or a desktop computer. In some implementations, the physical second device 130 has a touchpad and, in some implementations, the physical second device 130 has a touch-sensitive display (also known as a "touch screen" or "touch screen display").

In some implementations, the physical second device 130 has a graphical user interface ("GUI"), one or more processors, memory and one or more modules, programs or sets of instructions stored in the memory for performing multiple functions. In some implementations, the user 110 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, or digital video playing. Executable instructions for performing these functions may be included in a computer readable storage medium or other computer program product configured for execution by one or more processors.

In some implementation, presenting the content representing virtual content includes identifying a placement position for a virtual object or virtual surface corresponding to a real-world physical object (e.g., physical second device 130) or real-world physical surface. In some implementations, the placement position for the virtual object or virtual surface corresponding to the real-world physical object or real-world physical surface is based on a spatial location of a physical surface in the physical environment 100 relative to the physical first device 120 or physical second device 130. In some implementations, the spatial location is determined using the image sensor 122 of the physical first device 120 and, in some implementations, the spatial location is determined using an image sensor external to the physical first device 120.

In some implementations, the physical first device 120 or the physical second device 130 create and track a correspondence between the real-world space (e.g., physical environment 100) the user 110 inhabits and a virtual space including virtual content. Accordingly, the physical first device 120 or the physical second device 130 may use world and camera coordinate systems 102 (e.g., a y-axis points upward, a z-axis points toward the user 110, and x-axis points toward the right of the user 110). In some implementations, configurations can change the origin and orientation of the coordinate system with respect to the real world. For example, each device may define its own local coordinate system.

In some implementations, each device combines information from the respective device's motion sensing hardware with analysis of the scene visible to the respective device's camera to create a correspondence between real and virtual spaces, e.g., via visual-inertial odometry (VIO). For example, each device (e.g., physical first device 120 and physical second device 130) may recognize notable features in the virtual environment 100 (e.g., plane detection), track differences in the positions of those features across video frames, and compare that information with motion sensing data. For example, by increasing the number of notable features in a scene image, the relative location of the physical second device 130 with respect to the physical first device 120 may be determined with further accuracy.

In some implementations, in order to prevent error (e.g., drift) due to small errors in inertial measurements, a tracking system that utilizes fixed reference points is used to determine relative inertial motion. For example, small errors between inertial measurements of the physical first device 120 and inertial measurements of the physical second device 130 may add up over time. These errors may affect the ability of the physical first device 120 to accurately present a virtual representation of the physical second device 130 to the user, e.g., a virtual representation of the physical second device 130 or the user's arm (e.g., physical appendage 115) may appear to slowly float toward the user 110 despite the physical second device 130 and the user's arm 35 remaining in a relatively constant location in the physical environment 100. For example, these errors may be estimated and compared to a threshold value. If the errors exceed the threshold value, the physical first device 120 may then utilize fixed reference points to determine relative inertial motion.

In some implementations, the physical first device 120 or the physical second device 130 are configured to use one or more cameras (e.g., image sensor 122) to identify a fixed reference point in an image (e.g., a fixed point in the physical environment 100) and track the fixed reference point in additional images. For example, upon determining an estimated error associated with the position and orientation of the physical second device 130 to the physical first device 120 is greater than a threshold, the physical first device 120 may run a localization algorithm that uses the reference point to track movement in space (e.g., simultaneous localization and mapping (SLAM)). In some implementations, an inertial measurement device may perform inertial measurements at a higher frequency than a tracking system performs tracking measurements. Thus, inertial measurements from an inertial measurement device may be primarily used by a processing system to determine movement of the user 110, physical first device 120, physical second device 130, or part of user's body and may be corrected at given intervals based on tracking data. In some implementations, other tracking systems are used such as emitters at fixed locations in the physical environment 100 or the physical second device 130. For example, sensors on the physical first device 120 or physical second device 130 may detect signals from the emitters and determine a position of a user 110, physical first device 120, or physical second device 130 within the physical environment 100 based on the emitted signals.

Furthermore, the coordinate system of the physical first device 120 (e.g., coordinate system 102) may be synchronized with the coordinate system of the physical second device 130 (e.g., coordinate system 102). Such synchronization may also compensate for a situation where one of the two devices is unable to effectively track the physical environment 100. For example, unpredictable lighting conditions may result in a reduced ability to track the scene or excessive motion (e.g., too far, too fast, or shaking too vigorously) may result in a blurred image or too much distance for tracking features between video frames, reducing tracking quality.

Figure 2:
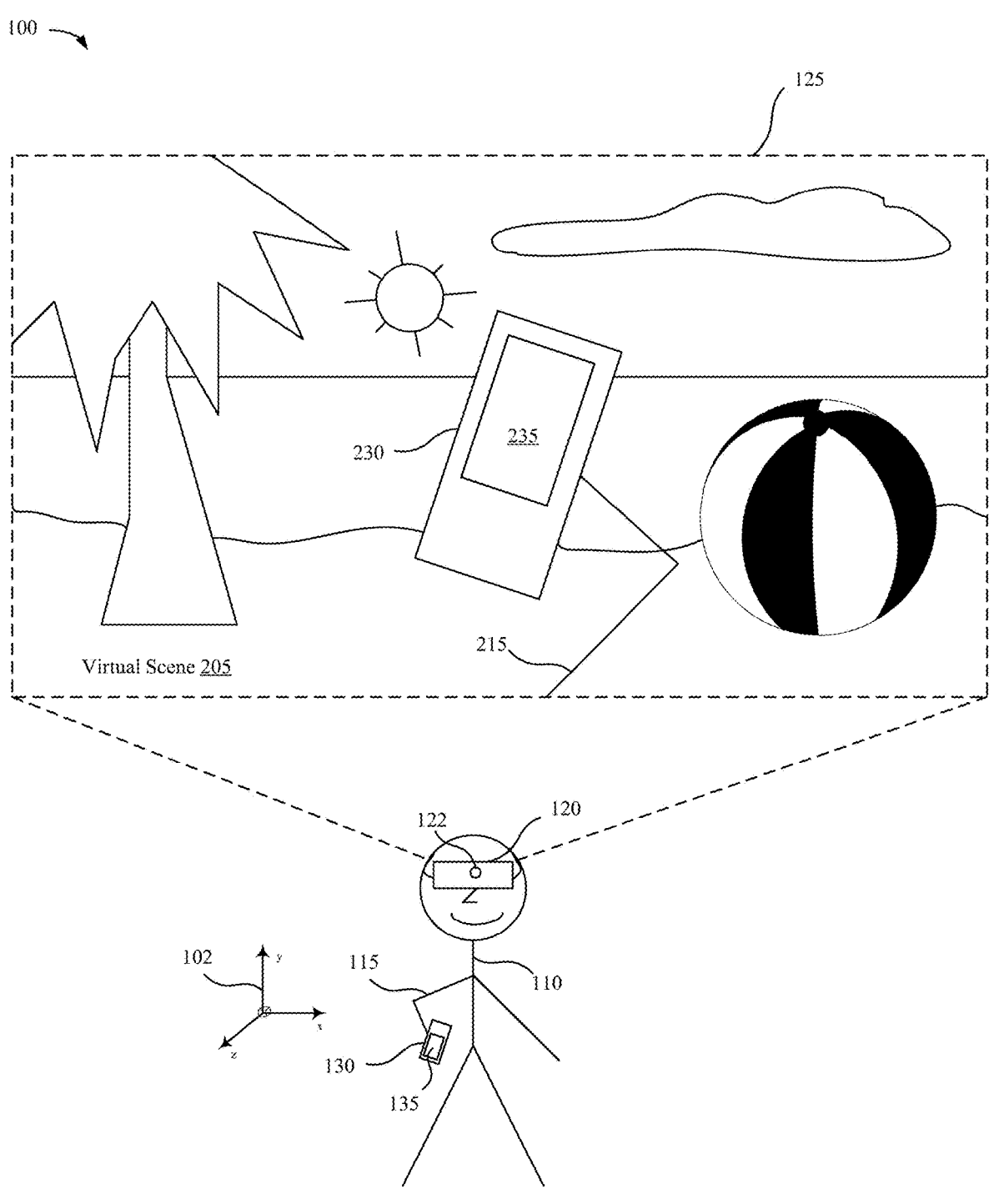
FIG. 2 illustrates the example physical environment of FIG. 1 including a display of the first device in accordance with some implementations.

FIG. 2 illustrates the example physical environment 100 of FIG. 1 including a display 125 of the physical first device 120. In some implementations, the physical first device 120 (e.g., an HMD) presents a virtual scene 205 to the user 110 via a display 125. For example, if the virtual scene 205 represents an ocean side beach, visual sensory content corresponding to the ocean side beach may be presented on the display 125 of the physical first device 120. In some implementations, a virtual appendage 215, e.g., a manifestation of the user's physical presence (e.g., physical appendage 115), may be presented in the virtual scene 205. Thus, in some implementations, the user 110 can still see a representation of their physical presence in the virtual scene 205.

In some implementations, the physical first device 120 may determine the position or orientation of the physical second device 130, the user 110, or the physical appendage 115 by collecting image data with the image sensor 122 of the physical first device 120. Furthermore, in some implementations, the virtual scene 205 may include a virtual second device 230 and a virtual display 235 of the virtual second device 230, e.g., a virtual representation of the physical second device 130 and the physical display 135 of the physical second device 130. For example, the user 110 may reach out with an arm (e.g., physical appendage 115) holding a physical second device 130. Thus, the virtual scene 205 may include a virtual appendage 215, as well as a virtual second device 230.

Figure 3A:
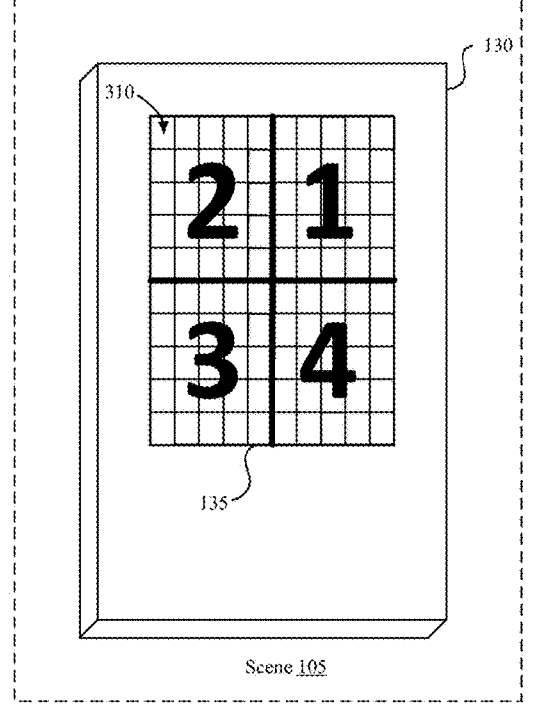
FIG. 3A illustrates a pattern displayed by the second device of FIG. 1 in accordance with some implementations.

FIG. 3A illustrates a marker 310 displayed by the physical second device 130 of FIG. 1. In some implementations, the user 110 is unable to view the physical display 135 of the physical second device 130 because the user 110 is immersed in the virtual scene 205. Accordingly, in some implementations, the physical second device 130 displays marker 310 on the physical display 135 of the physical second device 130 to facilitate tracking of the physical second device 130 by the physical first device 120. In some implementations, the marker 310 serves as a reference point for the physical first device 120 to accurately track the location and rotation of the physical second device 130. In some implementations, the marker 310 is displayed on a forward-facing display of the physical first device 120 and the marker 310 serves as a reference for the physical second device 130 to accurately track the location and rotation of the physical first device 120. For example, display of the marker 310 may allow the physical second device 130 to estimate the required pose degrees of freedom (translation and rotation) to determine the pose of the marker 310. Thus, by displaying the marker 310 (e.g., a known pattern) on one device and tracking the marker with the other device, the ability for one device to track the other is enhanced, e.g., drift resulting from errors in inertial measurements from inertial measurement devices may be corrected/minimized. For example, tracking may be enhanced by combining the pose of the marker 310 with the inertial measurements the inertial measurement devices.

In some implementations, the marker 310 is an image containing texture/information that allows the image to be detected and makes it possible to determine the image's pose with respect to a camera. In some implementations, the marker 310 is a pattern and, in some implementations, the marker is a singular indicator. For example, the marker 310 may include a grid, cross-hatching, quadrant identifiers, screen borders, etc. In some implementations, the marker 310 is pre-determined and stored on the physical second device 130. In some implementations, the marker 310 is communicated to the physical first device 120 and, in some implementations, the marker 310 is determined by the physical first device 120 and communicated to the physical second device 130. In some implementations, the marker 310 is communicated to the physical second device 130 and, in some implementations, the marker 310 is determined by the physical second device 130 and communicated to the physical first device 120.

In some implementations, the marker 310 is only displayed when the screen is visible to the other device. For example, marker 310 may only be displayed on physical display 135 of physical second device 130 when physical display 135 is visible to physical first device 120. In some implementations, the other device detects an obstruction of the marker 310. For example, an obstruction of the physical display 135 may be detected visually by collecting image data with image sensor 122. As another example, an obstruction of the marker 310 may be detected based on a touch sensor. For example, a touch screen of physical display 135 may detect an obstruction (e.g., a finger placed over the display of the marker). In some implementations, the marker 310 is only displayed on certain portions of a display when an obstruction of the marker 310 is detected. For example, if user 100 obstructs a portion of physical display 135 (e.g., with a finger), the obstruction may be detected (e.g., visually or based on a touch sensor) and the marker 310 may be displayed on the unobstructed portions of physical display 135.

Figure 3B:
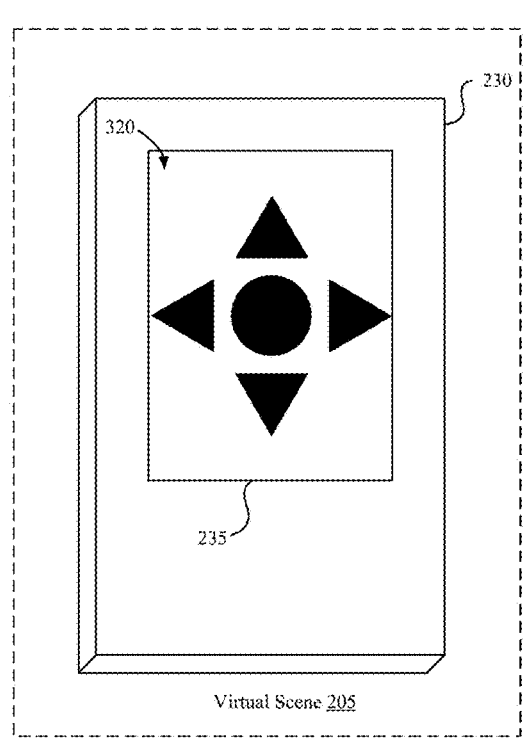
FIG. 3B illustrates a virtual representation of the second device of FIG. 1 in accordance with some implementations.

FIG. 3B illustrates a virtual second device 230 representing a virtual representation of the physical second device 130 of FIG. 1. In some implementations, the virtual second device 230 includes a virtual display 235. In some implementations, the physical second device 130 serves as a controller of the virtual experience, e.g., touch screen inputs to physical display 135 are detected by physical second device 130 and sent to physical first device 120 as inputs. For example, the user 110 may interact with the virtual scene 205 via an input interface of the physical second device 130. Accordingly, the physical second device 130 may be presented in the virtual scene 205 as a virtual second device 230, including a virtual display 235. In some implementations, the virtual display 235 may present a virtual controller 320, including one or more controls, selectable buttons, or any other combination of interactive or non-interactive objects. For example, the user 110 may navigate the virtual scene 205 by interacting with the physical second device 130 based on the virtual representation of the physical second device 130, e.g., virtual second device 230.

In some implementations, a virtual representation of the physical second device 130 can be a two-dimensional area that increases an amount of data (e.g., virtual representations of objects) that can be presented at a particular time, thereby improving the virtual experience of the user 110. Furthermore, the virtual second device 230 may have dimensions that are proportional to the input devices (e.g., physical input devices). For example, the user 110 may interact with the physical second device 130 more efficiently because input provided by the user 110 through the physical second device 130 corresponds visually with indications of that input in the virtual second device 230. In particular, a user 110 may be able to look at the virtual second device 230 when physically interacting with the physical second device 130 and the user 110 can expect that their input through the virtual second device 230 will correspond to similar input (or interaction) at the physical second device 130. In addition, because each position on the virtual display 235 of the virtual second device 230 may correspond to a single position on the physical display 135 of the physical second device 130, the user 110 may navigate the virtual scene 205 using the virtual controller 320 presented on the virtual display 235 of the virtual second device 230 (e.g., up to and including the borders of the virtual representation).

Figure 4:
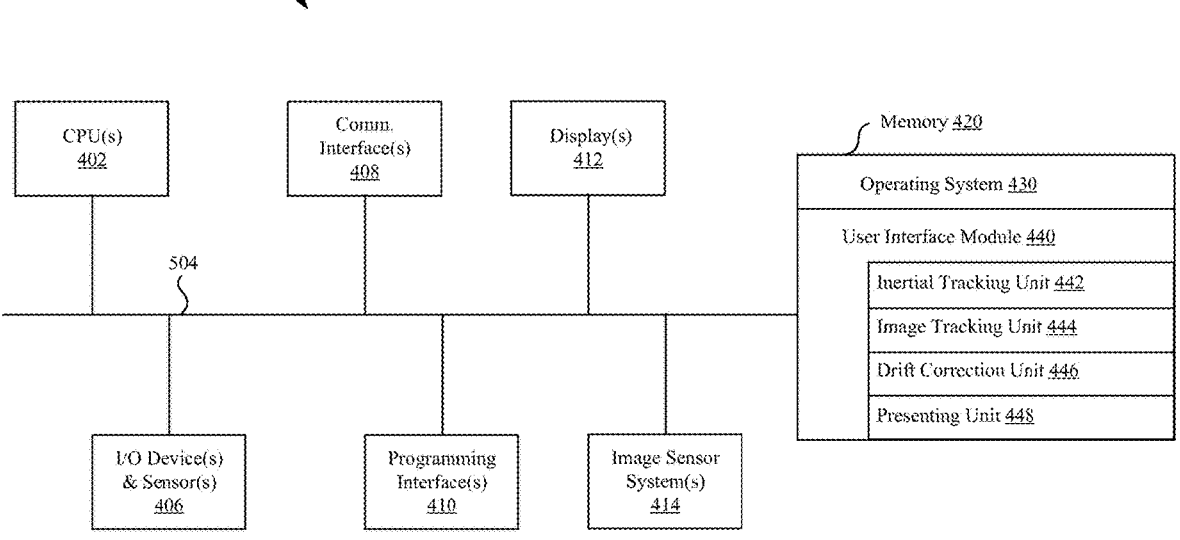
FIG. 4 is a block diagram of an example first device in accordance with some implementations.

FIG. 4 is a block diagram of an example of the physical first device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the physical first device 120 includes one or more processing units 402 (e.g., microprocessors, ASICs, FPGAs, GPUs, CPUs, processing cores, or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 410, one or more displays 412, one or more interior or exterior facing image sensor systems 414, a memory 420, and one or more communication buses for interconnecting these and various other components.

In some implementations, the one or more communication buses include circuitry that interconnects and controls communications between system components. In some implementations, the one or more I/O devices and sensors 406 include at least one of an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 412 are configured to present a user interface to the user 110. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), a retinal projection system, or the like display types. In some implementations, the one or more displays 412 correspond to diffractive, reflective, polarized, holographic, or waveguide displays. In one example, the physical first device 120 includes a single display. In another example, the physical first device 120 includes a display for each eye of the user 110. In some implementations, the one or more displays 412 are capable of presenting a CGR environment.

In some implementations, the one or more image sensor systems 414 are configured to obtain image data that corresponds to at least a portion of the physical environment 100. For example, the one or more image sensor systems 414 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 414 further include illumination sources that emit light upon the physical environment 100, such as a flash or illumination.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a user interface module 440.

The operating system 430 includes procedures for handling various basic system services and for performing hardware dependent tasks. In some implementations, the user interface module 440 is configured to present a user interface that utilizes inertial and image tracking to identify a location of a physical second device 130 and present a virtual representation of the physical second device 130 via the one or more displays 412. To that end, in various implementations, the user interface module 440 includes an inertial tracking unit 442, an image tracking unit 444, a drift correction unit 446, and a presenting unit 448.

In some implementations, the inertial tracking unit 442 is configured to obtain inertial data and to use that inertial data to determine the location or position of the physical first device 120. In some implementations, the inertial tracking unit may also obtain inertial data from a physical second device 130 and use the inertial data to determine a location of the physical second device 130. In some implementations, the inertial tracking unit may determine a relative location and rotation of the physical second device 130 with respect to the physical first device 120. To that end, in various implementations, the inertial tracking unit 442 includes instructions or logic therefor, and heuristics and metadata therefor.

In some implementations, the image tracking unit 444 is configured to obtain image data and to use that data to identify the location of the physical first device 120. For example, the image tracking 444 unit may track the changes in images to identify movement of the physical first device 120. In some implementations, the image tracking unit 444 may identify landmarks or reference points in the image data to identify the location of the physical first device 120. In some implementations, the physical first device 120 may receive image data from a physical second device 130 and use the received image data to determine the location of the physical first device 120 or the physical second device 130. In some implementations, the image tracking unit 444 may identify a marker 310 displayed by the physical second device 130 to identify a relative location and rotation of the physical second device 130. To that end, in various implementations, the image tracking unit 444 includes instructions or logic therefor, and heuristics and metadata therefor.

In some implementations, the drift correction unit 446 is configured to use image tracking data to correlate inertial tracking data and determine location and rotation corrections for the physical first device 120, a physical second device 130, or the relative position of the physical first device 120 and the physical second device 130. To that end, in various implementations, the drift correction unit 446 includes instructions or logic therefor, and heuristics and metadata therefor.

In some implementations, the presenting unit 448 is configured to present content via the one or more displays 412. In some implementations, the content includes a virtual representation of the physical second device 130 (e.g., virtual second device 230), where the virtual representation of the physical second device 130 is presented based on the determined relative location of the physical second device 130. To that end, in various implementations, the presenting unit 448 includes instructions or logic therefor, and heuristics and metadata therefor.

Although the inertial tracking unit 442, the image tracking unit 444, the drift correction unit 446, and the presenting unit 448 are shown as residing on a single device (e.g., the physical first device 120), it should be understood that in other implementations, any combination of these units may be located in separate computing devices.

Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 5:
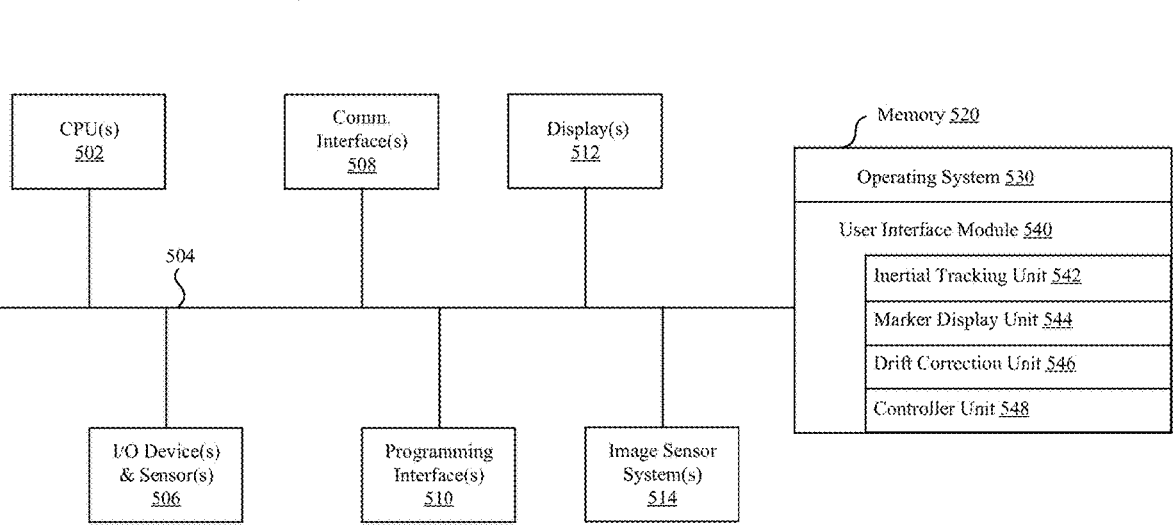
FIG. 5 is a block diagram of an example second device in accordance with some implementations.

FIG. 5 is a block diagram of an example of the physical second device 130 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the physical second device 130 includes one or more processing units 502 (e.g., microprocessors, ASICs, FPGAs, GPUs, CPUs, processing cores, or the like), one or more input/output (I/O) devices and sensors 506, one or more communication interfaces 508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 510, one or more displays 512, one or more interior or exterior facing image sensor systems 514, a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an IMU, an accelerometer, a magnetometer, a gyroscope, a thermometer, a or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 512 are configured to present a user interface to the user 110. In some implementations, the one or more displays 512 correspond to holographic, DLP, LCD, LCoS, OLET, OLED, SED, FED, QD-LED, MEMS, a retinal projection system, or the like display types. In some implementations, the one or more displays 512 correspond to diffractive, reflective, polarized, holographic, or waveguide displays. In one example, the physical second device 130 includes a single display. In some implementations, the one or more displays 412 are capable of presenting a CGR environment.

In some implementations, the one or more image sensor systems 514 are configured to obtain image data that corresponds to at least a portion of the physical environment 100. For example, the one or more image sensor systems 514 may include one or more RGB cameras (e.g., with a CMOS image sensor or a CCD image sensor), monochrome cameras, IR cameras, event-based cameras, or the like. In various implementations, the one or more image sensor systems 514 further include illumination sources that emit light upon the physical environment 100, such as a flash or illumination.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and a user interface module 540.

The operating system 530 includes procedures for handling various basic system services and for performing hardware dependent tasks. In some implementations, the user interface module 540 is configured to present a marker 310 via the one or more displays 512 that facilitates image tracking by the physical first device 120. To that end, in various implementations, the user experience module 540 includes an inertial tracking unit 542, a marker display unit 544, a drift correction unit 546, and a controller unit 548.

In some implementations, the inertial tracking unit 542 is configured to obtain inertial data and to use that inertial data to determine the location or position of the physical second device 130. In some implementations, the inertial tracking unit 542 may also obtain inertial data from the physical first device 120 and use the inertial data to determine a location of the physical first device 120. In some implementations, the inertial tracking unit 542 may determine a relative location and rotation of the physical second device 130 with respect to the physical first device 120. To that end, in various implementations, the inertial tracking unit 542 includes instructions or logic therefor, and heuristics and metadata therefor.

In some implementations, the marker display unit 544 is configured to display a marker 310 on the physical display 135 of the physical second device 130. In some implementations, the marker 310 displayed on the physical second device 130 facilitates the detection of the physical second device 130 in the physical environment 100 by the physical first device 120. For example, the physical first device 120 may collect image data including the marker 310 displayed on the physical second device 130 and identify the location of the physical second device 130 by detecting the marker 310 in the image data. To that end, in various implementations, the image tracking unit 544 includes instructions or logic therefor, and heuristics and metadata therefor.

In some implementations, the drift correction unit 546 is configured to use image tracking data to correlate inertial tracking data and determine location and rotation corrections for the physical first device 120, the physical second device 130, or the relative position of the physical first device 120 and the physical second device 130. To that end, in various implementations, the drift correction unit 446 includes instructions or logic therefor, and heuristics and metadata therefor.

In some implementations, the controller unit 548 is configured to receive input at the physical second device 130 from a user 110, where the input is associated with a virtual interface presented to the user 110 by the physical first device 120. For example, the user 110 may navigate the virtual scene 205 in the physical environment 100 by making controller selections on the touchscreen of the physical second device 130, where the users inputs correspond to the virtual representation of the second device presented by the physical first device 120. To that end, in various implementations, the controller unit 548 includes instructions or logic therefor, and heuristics and metadata therefor.

Although the inertial tracking unit 542, the marker display unit 544, the drift correction unit 546, and the controller unit 548 are shown as residing on a single device (e.g., the physical second device 130), it should be understood that in other implementations, any combination of these units may be located in separate computing devices.

Moreover, FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 6:
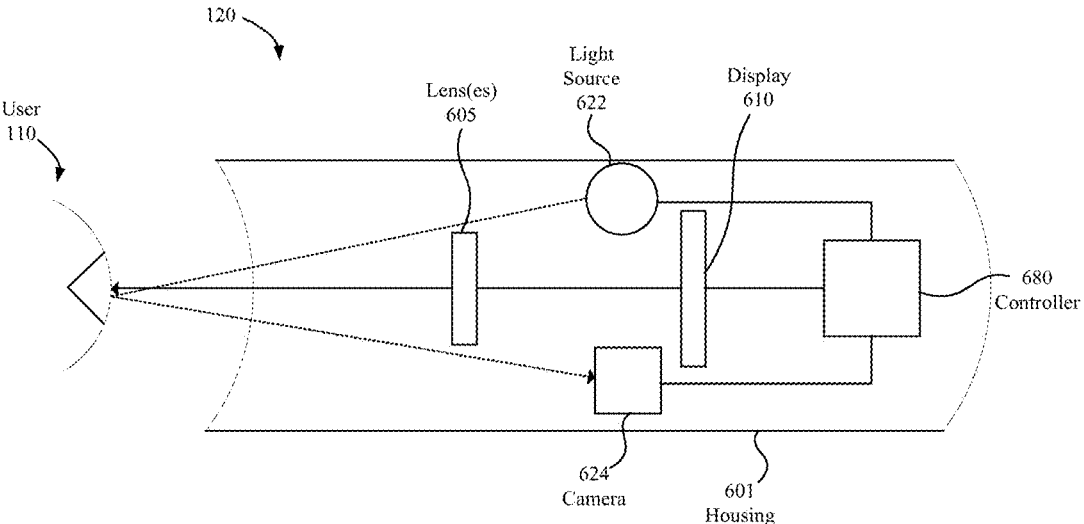
FIG. 6 is a block diagram of an example head-mounted device (HMD) in accordance with some implementations.

FIG. 6 illustrates a block diagram of an exemplary physical first device 120, e.g., a head-mounted device, in accordance with some implementations. The physical first device 120 includes a housing 601 (or enclosure) that houses various components of the physical first device 120. The housing 601 includes (or is coupled to) an eye pad (not shown) disposed at a proximal (to the user 110) end of the housing 601. In various implementations, the eye pad is a plastic or rubber piece that comfortably and snugly keeps the physical first device 120, e.g., a head-mounted device, in the proper position on the face of the user 110 (e.g., surrounding the eye of the user 110).

The housing 601 houses a display 610 that displays an image, emitting light towards or onto the eye of a user 110. In various implementations, the display 610 emits the light through an eyepiece having one or more lenses 605 that refracts the light emitted by the display 610, making the display appear to the user 110 to be at a virtual distance farther than the actual distance from the eye to the display 610. For the user 110 to be able to focus on the display 610, in various implementations, the virtual distance is at least greater than a minimum focal distance of the eye (e.g., 7 cm). Further, in order to provide a better user experience, in various implementations, the virtual distance is greater than 1 meter.

The housing 601 also houses a tracking system including one or more light sources 622, camera 624, and a controller 680. The one or more light sources 622 emit light onto the eye of the user 110 that reflects as a light pattern (e.g., a circle of glints) that can be detected by the camera 624. Based on the light pattern, the controller 680 can determine an eye tracking characteristic of the user 110. For example, the controller 680 can determine a gaze direction or a blinking state (eyes open or eyes closed) of the user 110. As another example, the controller 680 can determine a pupil center, a pupil size, or a point of regard. Thus, in various implementations, the light is emitted by the one or more light sources 622, reflects off the eye of the user 110, and is detected by the camera 624. In various implementations, the light from the eye of the user 110 is reflected off a hot mirror or passed through an eyepiece before reaching the camera 624.

The display 610 emits light in a first wavelength range and the one or more light sources 622 emit light in a second wavelength range. Similarly, the camera 624 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user 110 interaction (e.g., the user 110 selects an option on the display 610 by looking at it), provide foveated rendering (e.g., present a higher resolution in an area of the display 610 the user 110 is looking at and a lower resolution elsewhere on the display 610), or correct distortions (e.g., for images to be provided on the display 610).

In various implementations, the one or more light sources 622 emit light towards the eye of the user 110 which reflects in the form of a plurality of glints.

In various implementations, the camera 624 is a frame/shutter-based camera that, at a particular point in time or multiple points in time at a frame rate, generates an image of the eye of the user 110. Each image includes a matrix of pixel values corresponding to pixels of the image which correspond to locations of a matrix of light sensors of the camera.

In various implementations, the camera 624 is an event camera comprising a plurality of light sensors (e.g., a matrix of light sensors) at a plurality of respective locations that, in response to a particular light sensor detecting a change in intensity of light, generates an event message indicating a particular location of the particular light sensor.

FIG. 7 is a flowchart representation of a method 700 of interacting with a virtual environment in accordance with some implementations. In some implementations, the method 700 is performed by a device (e.g., physical first device 120 of FIGS. 1, 2, 4, and 6), such as an HMD, mobile device, desktop, laptop, or server device). In this example, the method 700 is performed on a device (e.g., physical first device 120) that has one or more displays for displaying images and thus some or all of the features of method 700 may be performed on the physical first device 120 itself. In other implementations, the method 700 is performed on more than one device, e.g., the physical first device 120 may wirelessly receive the images from an external camera or transmit the images to a separate device. In some implementations, the method 700 is performed by processing logic, including hardware, firmware, software, or a combination thereof. In some implementations, the method 700 is performed by a processor executing code stored in a non-transitory computer-readable medium (e.g., a memory).

A virtual scene 205 includes images (e.g., a sequence of frames or other images) displayed on at last a portion of a display space of a display of the HMD and viewed through one or more lenses of the HMD. For example, content, such as a movie, a sequence of images depicting 3D content, a series of VR images, or a series of other CGR images may be presented on an HMD or provided to an HMD for presentation. The images may include any content that is displayed on some or all of a display space. Each image may replace some or all of a previous image in a sequence, e.g., according to a frame rate. In some implementations, an image entirely replaces a prior image in the sequence in the display space of the display. In some implementations, an image replaces only a portion of the display space and some or all of the remaining potions of the display space are occupied by content from a prior image in the sequence or seen through a see-through-display.

At block 710, the method 700 obtains an image of a physical environment using an image sensor of a first device having a first display, the image including a marker displayed on a second display of a second device. For example, the first device may be an HMD including a camera and the second device may be a handheld device with a touchscreen display. In some implementations, a marker (e.g., a unique pattern) may be displayed on the touchscreen display of the handheld device and an image of the physical environment including the marker may be obtained by a camera of an HMD.

At block 720, the method 700 determines a relative position and orientation of the second device to the first device based on the marker. For example, the size, shape, angle or other observable characteristics of the marker in the image can be analyzed to determine the relative position and orientation of the marker to the first device (e.g., the device having the camera from which the image was obtained). In another example, the marker comprises a plurality of dots in a pattern and the relative distances between the dots in the image of the marker is used to determine the relative position and orientation of the marker to the first device. In these examples, since the position of the marker on the second device is known, the relative position and orientation of the second device to the first device can be determined accordingly.

Once relative position and orientation have been determined based on the marker or otherwise using image data, the relative position and orientation of the devices can be updated via inertial measurements. In some implementations, one or both of the first device and the second device include a relative inertial measurement system that determines relative inertial motion based on inertial measurements. For example, the inertial measurements from the first device and the second device may be synchronized in order to determine relative motion of the first device and the second device. In some implementations, most recently received inertial measurements may be used to determine relative movement, e.g., inertial measurements may be measured at a time interval and a previous time interval to determine relative movement. The relative inertial motion may be used to determine the relative position and orientation of the second device to the first device. However, based on the frequency of the inertial measurements, inaccuracies such as a drift affect may result.

In some implementations, inaccuracies associated with inertial measurements are minimized by utilizing the image data. In some implementations, the method 700 identifies the location of the marker in the image obtained at block 710. For example, the first device may identify the marker in the image and calculate the relative rotation or position of the second device based on the location of the marker in the image. Moreover, the method 700 may determine the relative position and orientation of the second device to the first device solely based on the position of the marker in the image data, e.g., without utilizing inertial measurements.

At block 730, the method 700 displays a representation of the second device on the first display based on the relative position and orientation of the second device, the representation including virtual content positioned in place of the pattern. For example, a user may see the representation of the second device via the first device, e.g., an HMD. In some implementations, the representation of the second device may display a controller or any combination of virtual interactive and non-interactive content. Thus, the user may use the controller or selectable content to interact with or guide an CGR experience.

Figure 8:
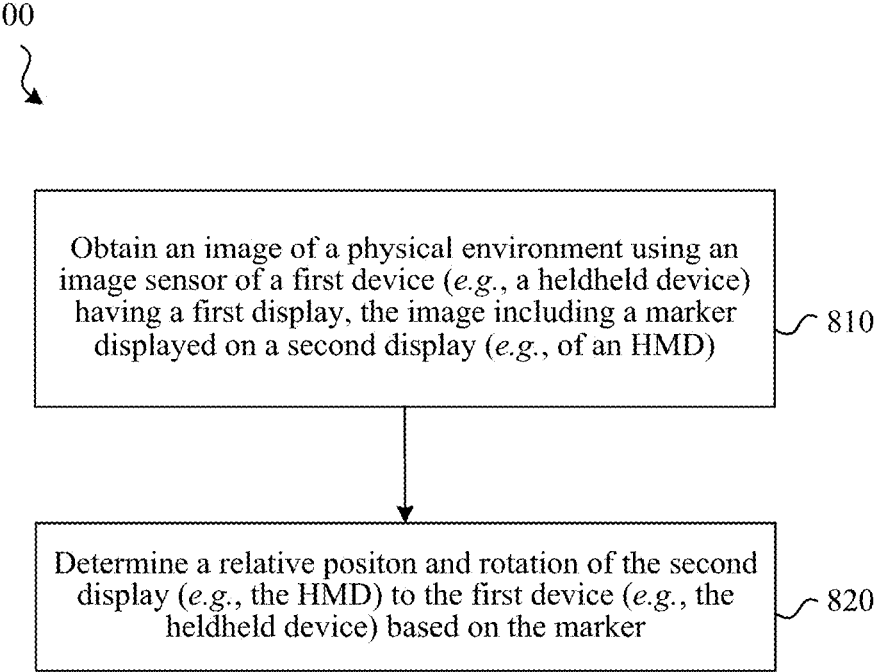
FIG. 8 is a flowchart representation of a method of providing an improved user interface for interacting with a virtual environment in accordance with some implementations.

FIG. 8 is a flowchart representation of a method 800 of interacting with a virtual environment in accordance with some implementations. In some implementations, the method 800 is performed by a device (e.g., physical second device 130 of FIGS. 1-3 and 5), such as a mobile device, desktop, laptop, or server device). In this example, the method 800 is performed on at least one device (e.g., physical second device 130 of FIGS. 1-3 and 5) that has at least one or more displays for displaying images and thus some or all of the features of method 800 may be performed on the physical second device 130 itself. In other implementations, the method 800 is performed on more than one device, e.g., the physical second device 130 may wirelessly receive the images from an external camera or transmit the images to a separate device. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains an image of a physical environment using an image sensor of a first device having a first display, the image including a marker displayed on a second display. For example, the first device may be a handheld device with a touchscreen display and a camera (e.g., physical second device 130) and the second display may be a front-facing display of an HMD (e.g., physical first device 120). In some implementations, a marker (e.g., a unique pattern) may be displayed on the second display of the HMD and an image of the physical environment including the marker may be obtained by a camera of the handheld device.

At block 820, the method 800 determines a relative position and orientation of the HMD to the first device based on the marker. For example, the size, shape, angle or other observable characteristics of the marker in the image can be analyzed to determine the relative position and orientation of the marker to the first device (e.g., the device having the camera from which the image was obtained). In another example, the marker comprises a plurality of dots in a pattern and the relative distances between the dots in the image of the marker is used to determine the relative position and orientation of the marker to the first device. In these examples, since the position of the marker on the second display is known, the relative position and orientation of the second device to the first device can be determined accordingly.

Once relative position and orientation have been determined based on the marker or otherwise using image data, the relative position and orientation of the devices can be updated via inertial measurements. In some implementations, one or both of the first device and the HMD include a relative inertial measurement system that determines relative inertial motion based on inertial measurements. For example, the inertial measurements from the first device and the second HMD may be synchronized in order to determine relative motion of the first device and the HMD. In some implementations, most recently received inertial measurements may be used to determine relative movement, i.e., inertial measurements may be measured at a time interval and a previous time interval to determine relative movement. The relative inertial motion may be used to determine the relative position and orientation of the HMD to the first device. However, based on the frequency of the inertial measurements, inaccuracies such as a drift affect may result.

In some implementations, inaccuracies associated with inertial measurements are minimized by utilizing the image data. In some implementations, the method 800 identifies the location of the marker in the image obtained at block 810. For example, the first device may identify the marker in the image and calculate the relative rotation or position of the HMD based on the location of the marker in the image. Moreover, the method 800 may determine the relative position and orientation of the HMD to the first device solely based on the position of the marker in the image data, e.g., without utilizing inertial measurements.

In some implementations, a light source (e.g., a sequence of LEDs, a pixel-based display, etc.) on a second device produces light at a given instant in time that encodes data useful in synchronizing motion data (e.g., accelerometer data, IMU data, etc.) generated via that second device with an image of the second device captured by a first device.

Figure 9:
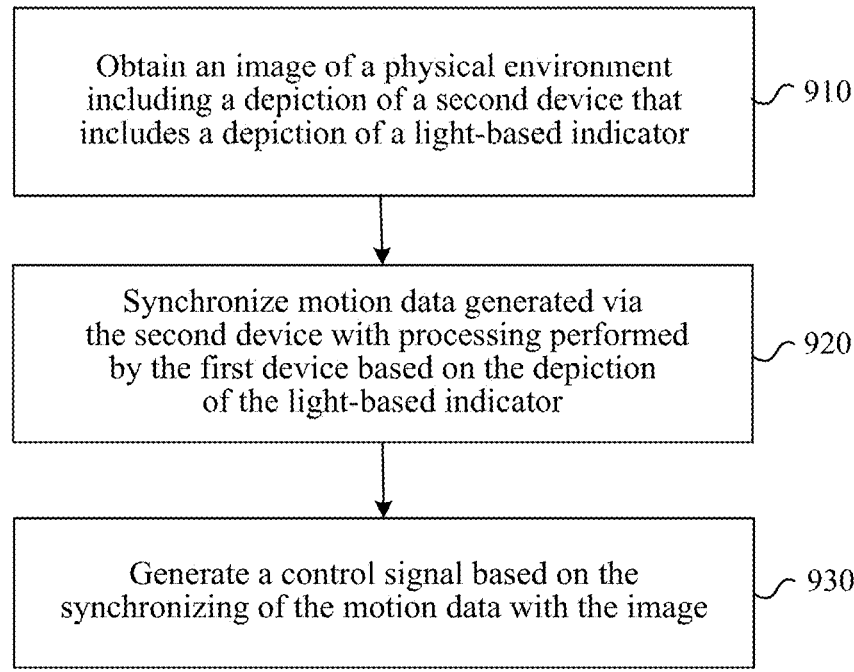
FIG. 9 is a flowchart representation of a method of tracking a position of a device using a light-based indicator to encode device motion or synchronization data.

FIG. 9 is a flowchart representation of a method 900 of tracking movement of a device using a light-based indicator to encode device movement or synchronization data. In some implementations, the method 900 is performed by a device (e.g., physical first device 120), such as an HMD, mobile device, desktop, laptop, or server device). In some implementations, the method 700 is performed by processing logic, including hardware, firmware, software, or a combination thereof. In some implementations, the method 900 is performed by a processor executing code stored in a non-transitory computer-readable medium (e.g., a memory).

At block 910, the method 900 obtains an image of a physical environment using the image sensor of a first device. The image includes a depiction of a second device. The depiction of the second device includes a depiction of a light-based indicator provided via a light source on the second device. In some implementations, the light-based indicator has a plurality of LEDs that produce a binary pattern of light encoding the motion data (e.g., accelerometer data or IMU data) or time data associated with generation of the motion data via the second device. For example, the second device's light-based indicator may be a plurality of LEDs that produce a binary pattern of light encoding current motion data generated at the second device. In another example, such LEDs may produce a binary pattern of light that encodes time data associated with generation of the motion data via the second device, e.g., the time that a motion sensor on the device captured the data relative to the time that the binary pattern is provided. In other implementations, the second device includes a pixel-based display that displays a pattern that encodes the motion or time data of the second device. In other implementations, the second device includes an IR light source that produces a pattern of IR light that encodes motion or time data of the second device.

At block 920, the method synchronizes motion data generated via the second device with processing performed by the first device based on the depiction of the light-based indicator. In some implementations, the motion data comprises sensor data regarding movement or positioning of the second device. For example, accelerometer data from a second device (e.g., a controller device) may be synchronized with an image of the second device that is captured by a first device (e.g., a head mounted device (HMD)). In some implementations, the capturing time of the image can be precisely synchronized with the capturing time of the accelerometer data. Any computer-vision based determinations made using the image (e.g., relative positioning or the second device and other objects) may thus be associated or otherwise synchronized with the motion data for the second device tracked by the second device's sensors for that same instant in time. The synchronization may be achieved without requiring wireless communication between the devices, e.g., without Bluetooth, wifi, etc. The use of a light-based indicator to provide motion data itself or time data useful in synchronizing motion data received via other channels may be simpler, more time and energy efficient, and more accurate that attempting to synchronize multiple devices using wifi or Bluetooth communications without such light-based indicator communication. In some implementations, two devices are able to precisely synchronize their respective clocks (e.g., determining clock offsets) without requiring wifi or Bluetooth time-synchronization communications.

In some implementations, the second device includes a light source that produces light at a given instant in time that will be captured in a single image and that encodes motion data or time synchronization data. In some implementations, such data is communicated for multiple instants in time, e.g., providing the second device's current position at time 1, the second device's current position at time 2, etc.

In some implementations, the second device is a smartphone, tablet, or other mobile device. In some implementations, the second device is a pencil, a pen, a trackpad, or other hand-held or hand-controlled device that includes a light source. In some implementations, the second device is a watch, a bracelet, an armband, an ankle band, a belt, a headband, a hat, a ring, an article of clothing, or other wearable device that includes a light source.

In some implementations, the second device includes a light source that emits light in the visible spectrum. In some implementations, the light source emits light in an IR or other invisible portion of the light spectrum. In some implementations, the light source emits light in both the visible and invisible portions of the spectrum.

In some implementations, the light source displays a light-based indicator by displaying a binary patter, a bar code, a QR code, a 2D code, a 3D code, graphics (e.g., an arrow having a direction and a size/length indicative of magnitude). In one implementation, the light source comprises eight LEDs configured to emit an eight-bit binary pattern indicating a number value that is associated with a particular position or movement, e.g., direction and/or magnitude of a movement from a prior time to a current time. In some implementations, the light-based indicator encodes multiple aspects of movement data, e.g., movement in each of 3 degrees of freedom of a motion sensor (e.g., x, y, z). In some implementations, a flashing or other time-based indication by the light-based indicator provides additional information useful in synchronizing the motion data of the second device with an image of the second device.

At block 930, the method generates a control signal based on the synchronizing of the motion data with the image. For example, if the motion data of the second device is associated with a movement of the second device intended to move an associated curser displayed on the first device, the method may generate an appropriate signal to cause such movement of the cursor.

Numerous specific details are set forth herein to provide a thorough understanding of the claimed subject matter.

However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a first device comprising a processor and an image sensor:
   obtaining image data comprising an image of a physical environment using the image sensor, the image comprising a marker displayed via a second device, wherein the marker is adapted over time based on a circumstance;
   determining a relative position and orientation of the second device to the first device based on the marker in the image data; and
   generating a control signal based on the relative position and orientation of the second device.

2. The method of claim 1, wherein the circumstance comprises detecting an obstruction.

3. The method of claim 1, wherein the circumstance comprises detecting an obstruction between the image sensor and the second device.

4. The method of claim 1, wherein the circumstance comprises detecting a touch event.

5. The method of claim 1, wherein the circumstance comprises a finger blocking a portion of a display of the second device.

6. The method of claim 1, wherein the circumstance comprises a relative motion, position, or rotation of the first device and second device.

7. The method of claim 1, wherein the circumstance comprises an attribute of the physical environment.

8. The method of claim 1, wherein the circumstance comprises a lighting condition of the physical environment.

9. The method of claim 1, wherein the marker comprises a pattern.

10. The method of claim 9, wherein the relative position and orientation of the second device to the first device is determined based on the relative distances between elements of the pattern produced by the LEDs on the second device.

11. The method of claim 9, wherein the pattern is a spatial pattern or a binary pattern that encodes data associated with motion of the second device.

12. The method of claim 11, wherein the motion is determined via an accelerometer or inertial measurement unit on the second device.

13. The method of claim 1, wherein the relative position and orientation of the second device to the first device is determined based on a single image of the image data.

14. The method of claim 1, wherein the relative position and orientation of the second device to the first device is determined based on multiple images of the image data.

15. The method of claim 1, wherein the first device uses the position and orientation of the second device to enable the second device to be used as a three-dimensional (3D) controller, a 3D pointer, or a user interface input device.

16. The method of claim 1, wherein the generated control signal modifies a user interface element displayed by the first device.

17. The method of claim 1, wherein the first device is a head-mounted device (HMD) and the second device comprises a hand-held device.

18. The method of claim 1 further comprising adjusting the determined relative position and orientation of the second device to the first device over time based on motion tracking on the first device and the second device over time, wherein the motion tracking comprises obtaining additional images of the physical environment using the image sensor, the additional images comprising the marker.

19. A first device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the first device to perform operations comprising:
   obtaining image data comprising an image of a physical environment using the image sensor, the image comprising a marker displayed via a second device, wherein the marker is adapted over time based on a circumstance;
   determining a relative position and orientation of the second device to the first device based on the marker in the image data; and
   generating a control signal based on the relative position and orientation of the second device.

20. A non-transitory computer-readable storage medium of a first device, storing program instructions executable via one or more processors to perform operations comprising:
   obtaining image data comprising an image of a physical environment using the image sensor, the image comprising a marker displayed via a second device, wherein the marker is adapted over time based on a circumstance;
   determining a relative position and orientation of the second device to the first device based on the marker in the image data; and
   generating a control signal based on the relative position and orientation of the second device.

* * * * *